Patented Jan. 3, 1933

1,892,703

UNITED STATES PATENT OFFICE

CARL T. GUNNAR LINDH, OF HIGHLAND PARK, MICHIGAN, ASSIGNOR TO AMERICAN RUBBER PRODUCTS COMPANY, OF DETROIT, MICHIGAN, A CORPORATION OF MICHIGAN

PROCESS OF PRODUCING PLASTIC COMPOSITION

No Drawing.  Application filed May 7, 1928.  Serial No. 275,977.

The present invention pertains to a novel method of producing plastic composition such as that used in the manufacture of storage battery boxes, panels and electric insulating articles.

The principal object of the invention is to provide such material having essentially greater uniformity, higher tensile strength, better dielectric strength and higher acid resistance than like material manufactured by the present processes.

This material consists of a mixture of hydro-carbons, such as asphalt and pitches, with fibres such as cotton fibres and filling material such as infusorial earth. According to the process of the prior art, the hydrocarbons are initially melted and put into a mixer, and the fibres and filling materials are subsequently added until a complete batch has been obtained according to formulas while the heat treatment and mixing operation continue. Due to the long time of mixing in the plastic state at fairly high temperature, the fibres become broken and scorched, and the tensile strength of the ultimate product is considerably reduced. Further, the immediate contact of the fibrous material, with the sticky, plastic mass retards the distribution of the fibres throughout the mass, with the result that the product is lacking in uniformity. This result affects the uniformity of all the properties of the substance, such as tensile strength, dielectric strength and acid resistance.

This difficulty is overcome in the present invention by reducing the heat treatment, particularly when the fibre is present in the mass, and previously subjecting the ingredients to a thorough mixing operation in the dry state prior to the application of heat. The hydro-carbon material is thus reduced to a powder while the fibres remain intact, and the mass in this condition requires a comparatively short heat treatment to render it plastic. This heat treatment is not sufficient to scorch or otherwise weaken the fibres.

The amounts of hydro-carbon material, fibres, and fillers to be used in any given mixture depend upon the nature of the product desired, but as an example we may use fifty percent hydrocarbon material, twenty-five percent fillers and twenty-five percent fibres. These substances are mixed thoroughly in the dry state, without the application of heat.

The mixture is then transferred to a plasticizer and heated at a temperature of preferably 350° F., while mixing, until the mass becomes plastic. It will be apparent that the comminution of the hydro-carbon material causes the material to become plastic under a shorter heat treatment than if it were is the solid state. It is then removed and is subjected to forming operations according to usual methods. As already indicated, the short duration of the heat treatment has practically no effect upon the strength of the fibres, and the previous dry mixing is so thorough that the final product is practically homogeneous and uniform, particularly with reference to the distribution of fibres on which the tensile strength depends.

The pressed product made according to this process has been found to have about seventy-five percent better tensile strength as well as better dielectric strength and acid resistance than the usual product made by present processes. The heat treatment is so rapid that only one plasticizer need be operated; the time required for pressing is sufficient to permit the addition of more dry mixed material to the plasticizer rendering the same plastic, and preparing it for pressing by the time the press is emptied of the preceding batch. In this sense the process may be considered to be continuous. This is a reduction in the amount of equipment necessary, and approximately fifty percent saving in labor. The smoking and burning of the material which occurs in the usual processes is absent when the method of this invention is used.

Although certain ratios of materials have been cited as an example, it will be understood that such ratios may be varied according to the nature of the desired product, and that the heat treatment may also be varied in duration and temperature according to specific conditions, the common characteristic in all cases being that the dry mixture of ingredients is heated only until it becomes plastic, unless prolonged heating is desired for particular reasons.

What I claim is:—

1. A process of producing plastic composition for battery boxes consisting in mixing fifty percent bituminous material, twenty-five percent fibrous material and twenty-five percent fillers in a dry state, and subsequently applying heat and continuing the mixing until the mass becomes plastic.

2. A process of producing plastic composition for battery boxes consisting in mixing fifty percent bituminous material, twenty-five percent fibrous material and twenty-five percent fillers in a dry state, and subsequently heating at 350° F.

3. A process of producing plastic composition for battery boxes consisting in mixing fifty percent bituminous material, twenty-five percent fibrous material and twenty-five percent fillers in a dry state, and subsequently transferring the mass to a plasticizer and heating until the mass becomes plastic.

4. A process of producing plastic composition for battery boxes consisting in mixing fifty percent bituminous material, twenty-five percent fibrous material and twenty-five percent fillers in a dry state, and subsequently transferring the mass to a plasticizer and heating to 350° F. until the mass becomes plastic.

In testimony whereof I affix my signature.

CARL T. GUNNAR LINDH.